July 4, 1950 H. A. FLOGAUS 2,514,322
ILLUMINATING UNIT FOR RECLINING VEHICLE SEAT BACKS
Filed April 26, 1946
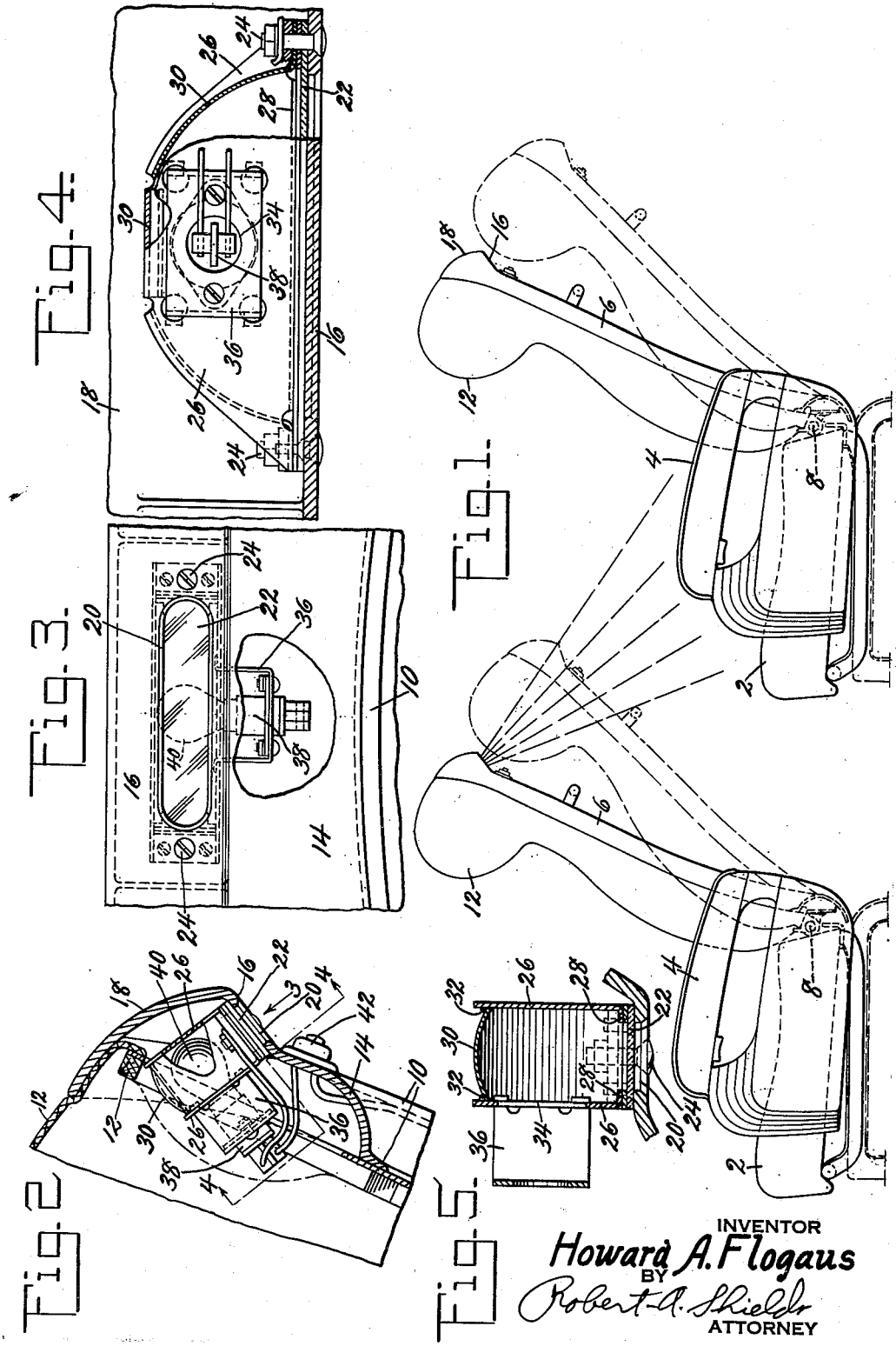
INVENTOR
Howard A. Flogaus
BY
Robert A. Shields
ATTORNEY Patented July 4, 1950

2,514,322

UNITED STATES PATENT OFFICE 2,514,322

ILLUMINATING UNIT FOR RECLINING VEHICLE SEAT BACKS

Howard A. Flogaus, Wallingford, Pa., assignor to ACF-Brill Motors Company, New York, N. Y., a corporation of Delaware Application April 26, 1946, Serial No. 665,087

1 Claim. (Cl. 240—7.1)

This invention relates to lights in general and in particular to lights carried on vehicle seat backs of the reclining type.

Lights have been used mounted in ceilings, under side of baggage racks, etc., in order that individual lights might be available for passengers riding in buses or railway cars. However, these ceiling or baggage rack lights necessarily annoy other passengers that might desire to rest. In the case of motor vehicles the driver usually turns off all lights in order that his vision will not be impaired. This lack of light in motor vehicles is very annoying to passengers who do not wish to rest and prefer to read. Likewise, the source of light in railway vehicles is very annoying to passengers who desire to rest. It is an object, therefore of the present invention to provide a light mounted on the back of the preceding seat and so arranged as to give ample illumination for the person in the next seat to the rear without in any way disturbing the other passengers of the vehicle or the driver in case of motor vehicles.

A further object of the invention is the provision of a light carried in the back of a reclining seat and in such a position as to prevent injury to the light or damage to a person's clothing entering or leaving adjacent seats.

A still further object of the invention is the provision of a light which can be mounted within the bulged upper portion of a reclining seat back.

These and other objects of the invention will be apparent to persons skilled in the art from a study of the following description and accompanying drawings, in which Fig. 1 is a plan view of two vehicle seats having the improved light attached thereto;

Fig. 2 is a sectional view taken substantially through the seat back adjacent the light fixture;

Fig. 3 is a plan view of the light looking upwardly toward the seat back top and in the direction as indicated by arrow three in Fig. 2;

Fig. 4 is a sectional view taken substantially on line 4—4 of Fig. 2, and

Fig. 5 is an enlarged sectional view of the light fixture and being taken substantially through the center thereof.

Referring now to the drawings in detail, it will be seen that the seats are formed with cushion members 2, side arms 4 and reclining seat backs 6 pivoted to the seat structure as at 8 so as to be reclined to any position desired by the passenger. The seat back is made of a metal frame 10 within which is mounted the upholstery unit 12. The upper portion of the seat back is bulged outwardly as at 14 with a portion of the bulge 16 being inclined upwardly and outwardly. This upwardly and outwardly inclined portion merges with a curved top 18, by means of which the bulge is closed and joined to the frame top part. The upwardly and outwardly inclined portion 16 is provided with an opening 20 adapted to be closed by a sheet of transparent material 22 clamped in position by the light fixture which is held in place by screws or bolts 24.

The light fixture itself is preferably made up of two plates having a main portion 26 and inwardly directed flanges 28. A compound curved plate 30 is welded as at 32 to these spaced flanged plates and together with the plates will form an open-sided box, the open side of which is positioned adjacent the transparent material, with the flanges holding the material in position. One of the flanged plates is provided with an opening 34 over which is removably secured a channel form member 36, on the web of which is mounted socket 38 carrying a source of light 40 extending into the open-sided box. Energization of the source of light may be accomplished by means of a switch 42 carried on the bulge immediately below the inclined portion 16.

It will be apparent from the preceding description and study of Fig. 2 that the light fixture is almost entirely mounted within the bulge of the seat back and does not encroach materially upon the upholstery space. It will also be apparent that with the seat formed as shown and described, the light from the source can pass upwardly and downwardly through the transparent material and will always be directed toward the seat immediately to the rear. Obviously, these lights cannot annoy passengers seated forwardly of the light and cannot annoy passengers seated to the rear since the rays of light are directed downwardly and cannot shine in the person's eyes. There will, of course, be sufficient illumination for the person desiring light to read when so desired and the lights as indicated will be individually controlled.

While the invention has been described more or less in detail with specific reference to the drawings, it will be obvious that slight modifications may be made without departing from the scope of the invention as defined by the accompanying claim.

What is claimed is:

In combination with vehicle seats arranged in tandem, a reclined back pivoted on each of said seats for reclining movement, a bulge formed on the upper rear portion of said reclining back and having a hollow interior, an upwardly and rearwardly inclined wall formed by the interior surface of said bulge, an opening formed in said wall, a light fixture comprising, a pair of spaced apart flanged plates, a compound curved plate welded thereto to form an open-sided box, an opening in one of said flanged plates adapted to receive a source of light, a channel shaped member secured to said last named flanged plate adjacent said opening, and a socket mounted on said channel shaped member and adapted to carry said source of light, said light fixture secured within said bulge to the inclined wall thereof so as to direct light upwardly and downwardly irrespective of the position of said reclining seat back.

HOWARD A. FLOGAUS.

REFERENCES CITED

The following references are of record in the file of this patent:

UNITED STATES PATENTS

| Number | Name | Date |
|---|---|---|
| 564,036 | Thompson | July 14, 1896 |
| 1,060,934 | Nordgren | May 6, 1913 |
| 1,525,374 | Craig et al. | Feb. 3, 1925 |
| 1,589,320 | McConnell | June 15, 1926 |
| 1,624,436 | Rosemier | Apr. 12, 1927 |
| 1,704,415 | Wenegrat | Mar. 5, 1929 |
| 2,204,327 | Stewart | June 11, 1940 |
| 2,240,634 | Winkler | May 6, 1941 |
| 2,261,223 | Carter | Nov. 4, 1941 |
| 2,300,523 | Reichart | Nov. 3, 1942 |
| 2,421,680 | Chandlin et al. | June 3, 1947 |

FOREIGN PATENTS

| Number | Country | Date |
|---|---|---|
| 367,200 | France | Aug. 24, 1906 |